US010445372B2

(12) United States Patent
Kanaujia et al.

(10) Patent No.: US 10,445,372 B2
(45) Date of Patent: Oct. 15, 2019

(54) METHOD AND DEVICE TO ACCESS AUXILIARY MAPPING DATA FOR A DATA STRUCTURE

(71) Applicant: SanDisk Technologies LLC, Plano, TX (US)

(72) Inventors: Vishal Kanaujia, Bangalore (IN); Manavalan Krishnan, Fremont, CA (US); Brian Walter O'Krafka, Austin, TX (US); Ramesh Chander, Bangalore (IN); Niranjan Patre Neelakanta, Bangalore (IN)

(73) Assignee: SanDisk Technologies LLC., Addison, TX (US)

(*) Notice: Subject to any disclaimer, the term of this patent is extended or adjusted under 35 U.S.C. 154(b) by 634 days.

(21) Appl. No.: 15/012,606

(22) Filed: Feb. 1, 2016

(65) Prior Publication Data

US 2017/0220634 A1     Aug. 3, 2017

(51) Int. Cl.
*G06F 16/00* (2019.01)
*G06F 16/901* (2019.01)

(52) U.S. Cl.
CPC .............................. *G06F 16/9027* (2019.01)

(58) Field of Classification Search
CPC ......... G06F 17/30961; G06F 17/30466; G06F 17/30469; G06F 16/9027; G06F 16/24544
See application file for complete search history.

(56) References Cited

U.S. PATENT DOCUMENTS

| | | | | |
|---|---|---|---|---|
| 6,499,036 | B1* | 12/2002 | Gurevich | G06F 9/542 707/778 |
| 6,865,577 | B1* | 3/2005 | Sereda | G06F 16/2255 707/699 |
| 2005/0138052 | A1* | 6/2005 | Zhou | G06F 16/284 |
| 2007/0165543 | A1* | 7/2007 | Joo | H04L 45/02 370/254 |
| 2009/0157684 | A1* | 6/2009 | Andersen | G06F 9/5083 |
| 2009/0164496 | A1* | 6/2009 | Carnathan | G06F 16/2358 |
| 2009/0216723 | A1* | 8/2009 | Harvey | H04L 29/12169 |
| 2010/0036872 | A1* | 2/2010 | Hiraiwa | G06F 16/164 707/E17.055 |
| 2010/0299421 | A1* | 11/2010 | Gurdan | G10H 1/0066 709/222 |
| 2013/0086006 | A1* | 4/2013 | Colgrove | G06F 3/0608 707/692 |
| 2015/0095590 | A1* | 4/2015 | Lu | G06F 12/10 711/146 |
| 2015/0278093 | A1 | 10/2015 | O'Krafka et al. | |
| 2015/0278271 | A1 | 10/2015 | Chander et al. | |
| 2015/0286695 | A1 | 10/2015 | Kadayam et al. | |

* cited by examiner

*Primary Examiner* — Noosha Arjomandi
(74) *Attorney, Agent, or Firm* — Patterson & Sheridan, LLP; Steven H. Versteeg (57) ABSTRACT

A method includes accessing, in response to initiating an operation targeting data, auxiliary mapping data to determine whether the auxiliary mapping data includes an indication of a key associated with a node of a hierarchical data structure that is associated with the data. In response to the auxiliary mapping data including the indication of the key, the data is accessed from a memory using a node identification associated with the key. In response to the auxiliary mapping data not including the indication of the key, the data is accessed from the memory using a search operation.

18 Claims, 6 Drawing Sheets

METHOD AND DEVICE TO ACCESS AUXILIARY MAPPING DATA FOR A DATA STRUCTURE

FIELD OF THE DISCLOSURE

The present disclosure is generally related to electronic devices and more particularly to accessing auxiliary mapping data for a data structure associated with a device.

BACKGROUND

Storage devices enable users to store and retrieve data. Examples of storage devices include volatile memory devices and non-volatile memory devices. A non-volatile memory may retain data after a power-down event, and a volatile memory may lose data after a power-down event.

Storage devices may store and access data using a data structure. An example of a data structure is a hierarchical (or "tree") data structure. A hierarchical data structure may indicate that data is to be stored at memory locations indicated by nodes (e.g., leafs) of the hierarchical data structure.

To locate the data after storing the data, a search may be performed based on an identifier (e.g., a key) associated with the data. For example, memory locations may be searched beginning at a particular memory location corresponding to a "root" node of the hierarchical data structure. Based on key values associated with data stored at the memory locations, the search may "branch" to different memory locations corresponding to different nodes of the hierarchical data structure until the key (and the data) is identified. Search of a hierarchical data structure consumes time and processing resources.

DETAILED DESCRIPTION

Auxiliary mapping data may be used to simplify certain operations to write, read, and modify data that is associated with a data structure. The auxiliary mapping data may indicate a mapping of a key (or an indication of a key, such as a hash of a key) and a node identification (ID) that indicates a node of the hierarchical data structure. For example, the auxiliary mapping data may include keys (or hash values of keys) and node IDs stored in a lookup table.

The auxiliary mapping data may simplify certain operations, such as by enabling direct access of the data based on a node ID. For example, by directly accessing data based on the node ID, a "search" for the data may be avoided. Reducing or avoiding instances of such searches may reduce latency of read operations, write operations, and update operations, as illustrative examples.

Particular aspects of the disclosure are described below with reference to the drawings. In the description, common or similar features may be designated by common reference numbers. As used herein, "exemplary" may indicate an example, an implementation, and/or an aspect, and should not be construed as limiting or as indicating a preference or a preferred implementation.

Figure 1A:
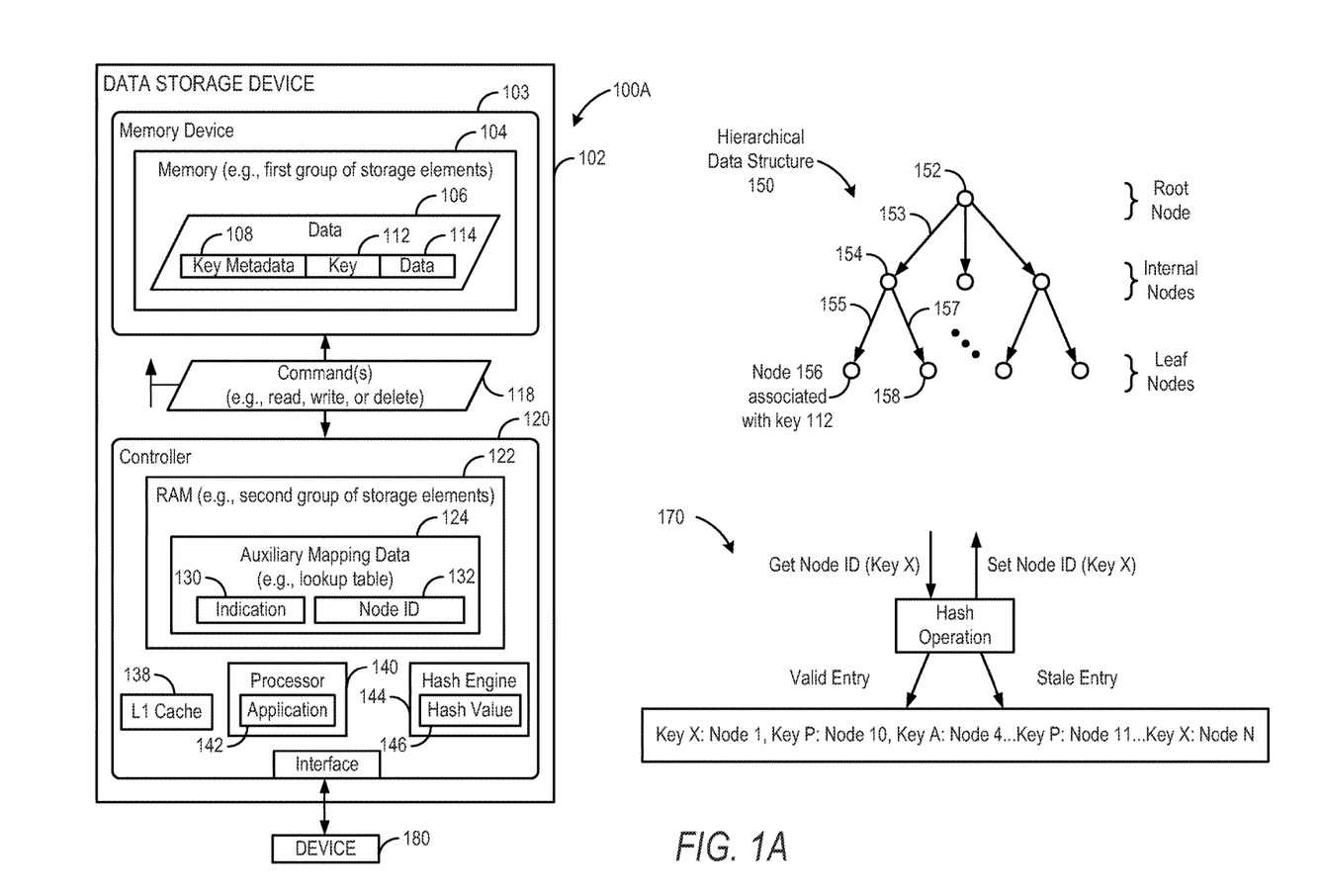
FIG. 1A is a diagram of a particular illustrative example of a system including a data storage device that stores auxiliary mapping data.

Referring to FIG. 1A, a particular illustrative example of system (e.g., an apparatus) is depicted and generally designated 100A. The system 100A includes a data storage device 102 and a device 180 (e.g., a host device or an access device). The data storage device 102 includes a memory device 103 and a controller 120. The controller 120 is coupled to the memory device 103.

The memory device 103 includes a memory 104 (e.g., a first group of storage elements), such as a non-volatile array of storage elements included in one or more memory dies. The memory 104 may include a flash memory (e.g., a NAND flash memory) or a resistive memory, such as a resistive random access memory (ReRAM), as illustrative examples. The memory 104 may have a three-dimensional (3D) memory configuration. As used herein, a 3D memory device may include multiple physical levels of storage elements (instead of having a single physical level of storage elements, as in a planar memory device). As an example, the memory 104 may have a 3D vertical bit line (VBL) configuration. In a particular implementation, the memory 104 is a non-volatile memory having a 3D memory array configuration that is monolithically formed in one or more physical levels of arrays of memory cells having an active area disposed above a silicon substrate. Alternatively, the memory 104 may have another configuration, such as a two-dimensional (2D) memory configuration or a non-monolithic 3D memory configuration (e.g., a stacked die 3D memory configuration).

The memory 104 includes one or more regions of storage elements. An example of a storage region is a block, such as a NAND flash erase group of storage elements, or a group of resistance-based storage elements in a ReRAM implementation. Another example of a storage region is a word line of storage elements (e.g., a word line of NAND flash storage elements or a word line of resistance-based storage elements). A storage region may have a single-level-cell (SLC) configuration, a multi-level-cell (MLC) configuration, or a tri-level-cell (TLC) configuration, as illustrative examples. Each storage element of the memory 104 may be programmable to a state (e.g., a threshold voltage in a flash configuration or a resistive state in a resistive memory configuration) that indicates one or more values. As an example, in an illustrative TLC scheme, a storage element may be programmable to a state that indicates three values. As an additional example, in an illustrative MLC scheme, a storage element may be programmable to a state that indicates two values.

The controller 120 may include a random access memory (RAM) 122 (e.g., a second group of storage elements), a level one (L1) cache 138, a processor 140, and a hash engine 144. The RAM 122 may store auxiliary mapping data 124 (e.g., a lookup table). The processor 140 may execute an application 142.

During operation, the data storage device 102 may write data 106 to the memory 104. For example, the data storage device 102 may receive the data 106 from the device 180 in connection with a request for write access to the memory 104.

The data 106 may include a database, a key value store, an object store, or a file system, as illustrative examples. The data 106 may be associated with a hierarchical data structure 150. The hierarchical data structure 150 may have a hierarchical (or a "tiered") format that includes a root node (e.g., a node 152), a set of internal nodes (e.g., a node 154), and a set of leaf nodes (e.g., a node 156 and a node 158).

A node of the hierarchical data structure 150 may be associated with particular data that is included in the data 106. To illustrate, the node 156 may be associated with data 114. The data 114 may be stored with key metadata 108 and a key 112 that is associated with the node 156.

Nodes of the hierarchical data structure 150 may be connected by branches of the hierarchical data structure 150. For example, FIG. 1A depicts that a branch 153 connects the nodes 152, 154. As another example, a branch 155 connects the nodes 154, 156. As an additional example, a branch 157 connects the nodes 154, 158.

Each node of the hierarchical data structure 150 may be associated with a key that identifies the node, and a branch may be associated with a set of values that includes the key. For example, the branch 153 may be associated with a set of keys, the branch 155 may be associated with a subset of the set of keys, and the node 156 may be associated with a key that is included in the subset (e.g., the key 112, as an illustrative example). To further illustrate, the node 158 may be associated with another key that is included in the subset.

A node of the hierarchical data structure 150 may be associated with particular data (e.g., one or more data objects) of the data 106. Depending on the particular example, the data 106 may include a database (e.g., a relational database), a key value store, an object store, a file system, other information, or a combination thereof. In some implementations, the key 112 points to a single data object of the data 106. In this case, the data 114 may include a single data object. In other implementations, the key 112 points to a group of multiple data objects of the data 106, such as if the data 114 includes multiple data objects. For example, the data 106 may correspond to a relational database, and the data 114 may include a group of multiple data objects corresponding to a row key of the non-relational database. The multiple data objects may be stored at memory locations of the memory 104 that are indicated by the hierarchical data structure 150 (e.g., the multiple data objects may be stored at physical addresses that are associated with leaf nodes of the hierarchical data structure 150). To further illustrate, a first data object may be stored at a first memory location (e.g., a particular word line) of the memory 104, and a second data object may be stored at a second memory location (e.g., another word line) of the memory 104. In this example, the first memory location may be associated with a particular node (e.g., the node 156) of the hierarchical data structure 150, and the second memory location may be associated with another node (e.g., the node 158) of the hierarchical data structure 150.

The data storage device 102 may initiate an operation targeting the data 106. For example, the operation may correspond to a read operation, a write operation, an update operation, or a delete operation. The data storage device 102 may initiate the operation in response to a request for access to the data 106 received from the device 180. Alternatively or in addition, the processor 140 may initiate the operation in connection with execution of the application 142.

The operation may target data associated with a particular node of the hierarchical data structure 150. To illustrate, the operation may target the data 114 associated with the node 156. In some implementations, a physical address of the memory 104 is associated with the node 156, and the key 112 indicates (or "points to") the node 156. In this case, the data storage device 102 may determine the physical address of the data 114 based on the key 112 (e.g., using a table that indicates a mapping of the key 112 to a physical address of the data 114). The operation may be performed in connection with one or more of a read process associated with the node 156 (e.g., to read the data 114), a write process associated with the node 156 (e.g., to write the data 114), or an update process associated with the node 156 (e.g., to update the data 114).

In response to initiating the operation, the data storage device 102 may search the auxiliary mapping data 124 to determine whether the auxiliary mapping data 124 includes information associated with the node 156. In an illustrative example, the hash engine 144 is configured to perform a hash operation based on a key to generate a hash value. For example, the hash engine 144 may be configured to perform a hash operation 170 based on the key 112 to generate a hash value 146.

The controller 120 is configured to access the auxiliary mapping data 124 to determine whether the auxiliary mapping data 124 includes an indication corresponding to the hash value 146. To illustrate, the auxiliary mapping data 124 may include an indication 130 associated with a node identification (ID) 132 that identifies a node of the hierarchical data structure 150. The controller 120 may be configured to search the auxiliary mapping data 124 by comparing one or more indications of the auxiliary mapping data 124 to the hash value 146 to determine whether the one or more indications correspond to the hash value 146. In an illustrative implementation, the controller 120 includes a comparator (e.g., comparator circuitry or instructions of a comparator program stored at a computer-readable memory) configured to compare the hash value 146 to the one or more indications.

If the hash value 146 corresponds to an indication included in the auxiliary mapping data 124, the data storage device 102 may use a node ID corresponding to the indication to access the data 114. To illustrate, if the indication 130 corresponds to the hash value 146, the data storage device 102 may access the data 106 (or a portion of the data 106) using the node ID 132, such as by "bypassing" the nodes 152, 154 to access the node 156 directly based on the node ID 132. For example, bypassing the nodes 152, 154 may include accessing a memory location corresponding to the node 156 (e.g., a word line of the memory 104 that is associated with the node 156) without accessing one or more memory locations corresponding to the nodes 152, 154 (e.g., one or more other word lines of the memory 104 that are associated with the nodes 152, 154). The controller 120 may cause the memory device 103 to access the data 106 by sending one or more commands 118, such as a read command, a write command, or a delete command. The one or more commands 118 may indicate the node ID 132 (or a physical address associated with the node ID 132) to enable the memory device 103 to directly access data associated with the node 156.

In some cases, the auxiliary mapping data 124 may not include an indication corresponding to the hash value 146. In this case, the controller 120 may optionally retry the hash operation one or more times to generate one or more hash values and may re-search the auxiliary mapping data 124 using the one or more hash values. For example, if multiple keys correspond to the hash value 146, the controller 120 may retry the hash operation to attempt to identify the "correct" key of the multiple keys. If the controller 120 is unable to identify the indication corresponding to the hash value 146 (e.g., after a threshold number of hash operations), the controller 120 may send one or more commands to the memory device 103 to cause the memory device 103 to search or "crawl" the hierarchical data structure 150 to locate the node 156 based on the value k. For example, the controller 120 may send the one or more commands 118, and the one or more commands 118 may indicate the value k. The memory device 103 may traverse one or more internal nodes (e.g., the nodes 152, 154) to locate the node 156 (e.g., by searching one or more memory locations corresponding to the nodes 152, 154 to locate a memory location corresponding to the node 156).

In response to searching for node 156, the data storage device 102 may update the auxiliary mapping data 124, such as by adding an indication of the key 112 (e.g., the indication 130) to the auxiliary mapping data 124. For example, the hash engine 144 may perform a hash operation based on the key 112 to generate the hash value 146, and the controller 120 may add the hash value 146 to the auxiliary mapping data 124, such as by creating the indication 130. The controller 120 may also add the node ID 132 to the auxiliary mapping data 124. In this example, the node ID 132 may be added to the auxiliary mapping data 124 in connection with on-the-fly (OTF) generation or updating of the auxiliary mapping data 124. Alternatively or in addition, one or more entries of the auxiliary mapping data 124 may be generated (or "pre-populated") prior to performing search operations, such as in response to power-up of the data storage device 102.

The controller 120 may be configured to update the auxiliary mapping data 124 using one or more write operations (e.g., to write the indication 130 and the node ID 132). In addition, the controller 120 may be configured to update the auxiliary mapping data 124 using one or more update operations (e.g., to update the indication 130, to update the node ID 132, or both, such as in response to moving data at the memory 104). Further, the controller 120 may be configured to update the auxiliary mapping data 124 using one or more delete operations (e.g., in response to deleting or invalidating data stored at the memory 104).

The examples described with reference to FIG. 1A may simplify operation of a device in connection with data accesses based on a data structure. For example, by directly accessing data based on a node ID, a "search" for the data may be avoided in some cases. Latency associated with an operation may be reduced by avoiding a "search" for the data.

Figure 1B:
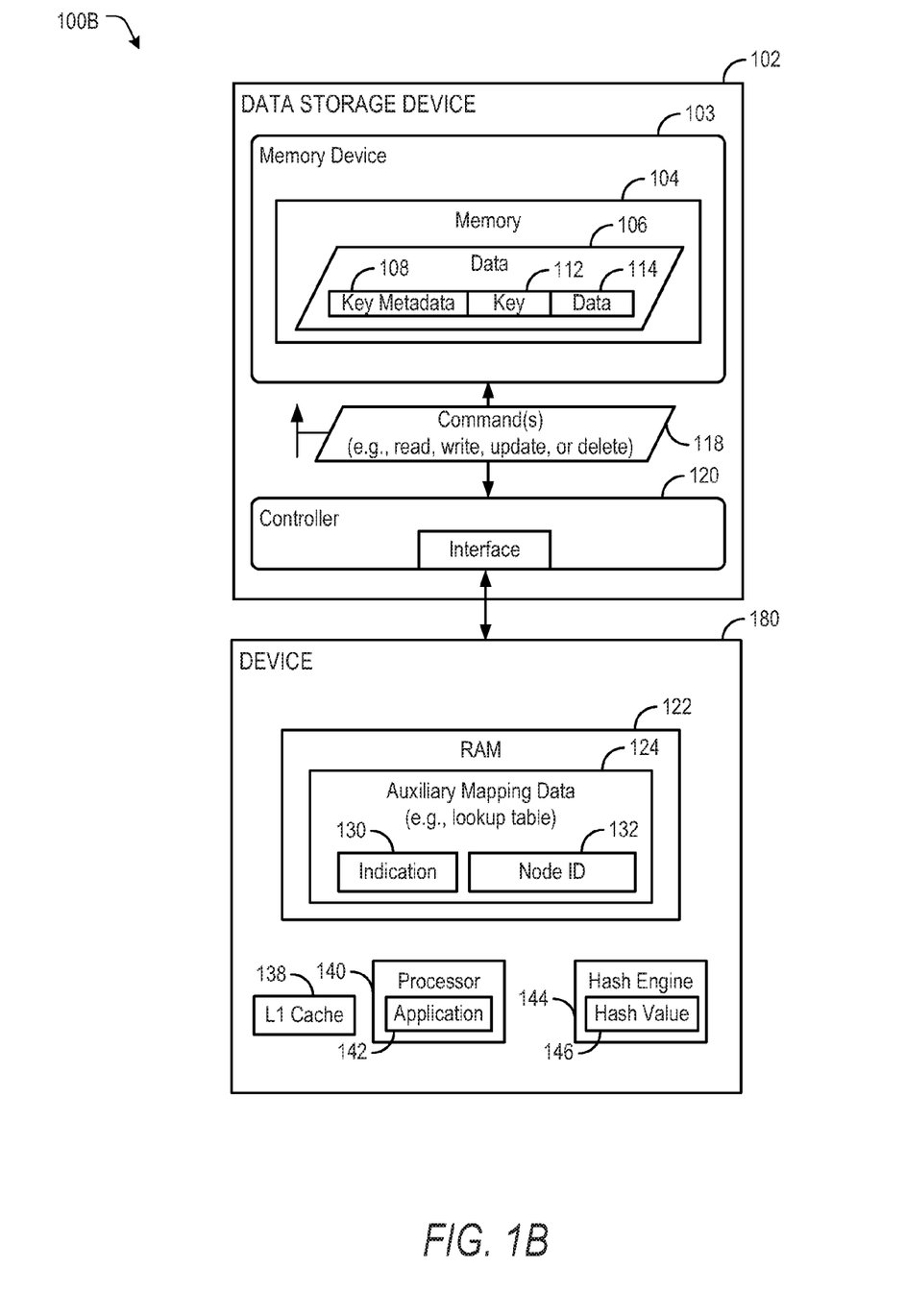
FIG. 1B is a diagram illustrating particular aspects of an illustrative example of another system that includes a data storage device and a device that stores auxiliary mapping data.

Referring to FIG. 1B, another illustrative example of a system is depicted and generally designated 100B. The system 100B includes the data storage device 102 and the device 180 of FIG. 1A.

In the example of FIG. 1B, the device 180 may include certain features described with reference to the data storage device 102 of FIG. 1A. For example, the device 180 may include the RAM 122, the L1 cache 138, the processor 140, and the hash engine 144. The RAM 122 may store the auxiliary mapping data 124, the processor 140 may execute the application 142, and the hash engine 144 may generate the hash value 146.

During operation, the device 180 may perform certain operations described with reference to FIG. 1A. For example, the device 180 may access the auxiliary mapping data 124 using the hash value 146 to determine whether the auxiliary mapping data 124 includes an indication associated with a node ID, such as the indication 130 associated with the node ID 132, as described with reference to FIG. 1A. If the auxiliary mapping data 124 includes the indication, the device 180 may provide one or more commands corresponding to the one or more commands 118 to the data storage device, and the one or more commands may indicate the node ID. If the auxiliary mapping data 124 does not include the indication, the device 180 may provide one or more commands corresponding to the one or more commands 118 to the data storage device, and the one or more commands may indicate a key (e.g., the key 112).

In an illustrative example, an apparatus includes a first group of storage elements (e.g., the memory 104) configured to store first data (e.g., the data 106) associated with a tiered data structure (e.g., the hierarchical data structure 150) having a root node (e.g., the node 152) and a set of leaf nodes (e.g., the nodes 156, 158). The apparatus further includes a second group of storage elements (e.g., the RAM 122) configured to store second data (e.g., the auxiliary mapping data 124) corresponding to a lookup table associated with the tiered data structure. The lookup table indicates a mapping of a leaf node (e.g., the node 156) of the set of leaf nodes to an indication (e.g., the indication 130) of a key (e.g., the key 112) that is associated with the leaf node. The apparatus may also include an L1 cache (e.g., the L1 cache 138) configured to store at least a subset of the first data, where the L1 cache is distinct from the lookup table.

In another example, a data storage device (e.g., the data storage device 102) includes a memory (e.g., the memory 104) and a controller (e.g., the controller 120) coupled to the memory. The controller is configured to access data (e.g., the data 106) stored at the memory based on a key (e.g., the key 112) associated with the data, and the data is associated with a hierarchical data structure (e.g., the hierarchical data structure 150). The controller is further configured to access lookup information (e.g., the auxiliary mapping data 124) associated with the hierarchical data structure. The lookup information includes an indication (e.g., the indication 130) associated with the key and further includes a node identification (e.g., the node ID 132) associated with the value.

The examples described with reference to FIG. 1B may simplify operation of a device in connection with data accesses based on a data structure. For example, by directly accessing data based on a node ID, a "search" for the data may be avoided in some cases. Latency associated with an operation may be reduced by avoiding a "search" for the data.

In connection with the disclosure, a supplementary (supportive) structure (e.g., the auxiliary mapping data 124) associated with a b-tree data structure (e.g., the hierarchical data structure 150) may provide a data accessibility path (e.g., a shortcut path) in order to avoid or reduce non-leaf node related bottleneck (e.g., searching of internal nodes of the hierarchical data structure 150). Techniques described herein may reduce latency to reach a leaf node (e.g., the node 156) where data (e.g., the data 114) for a particular key (e.g., the key 112) exists, hence improving read and in some cases update performance (e.g., throughput). The supplementary structure (e.g., the auxiliary mapping data 124) may be referred to as a b-tree fast node lookup structure (BFNLS).

The auxiliary mapping data 124 may provide a key to a node identification (e.g., the node ID 132, such as a unique ID for a node of a b-tree) for a key (e.g., the key 112), such that for a key the auxiliary mapping data 124 returns a valid leaf node ID (e.g., the node ID 132). The auxiliary mapping data 124 may be associated with a limit of the number of keys it can hold (e.g., due to memory constraints) and in some cases may return a negative result. In some cases, although the auxiliary mapping data 124 returns a valid node ID (e.g., the node ID 132), this does not guarantee that the key must exists in the node (e.g., due to because of realignments of the b-tree). In such cases, the b-tree key access may revert back to normal mode of operation of b-tree traversal (e.g., by "searching" nodes of the hierarchical data structure 150, such as the nodes 152, 154).

In an illustrative implementation, "hooks" may be planted in certain b-tree paths to keep the auxiliary mapping data 124 up-to-date, such as in a read key path, a write (and update) path, and a delete path. The hooks in the write path and the delete path may be optional and may be used to increase possibility of locating a key to valid leaf node mapping (e.g., a mapping between the indication 130 of the key 112 and the node 156).

In some implementations, the L1 cache 138 caches b-tree nodes in memory, flushes to disk, and reads back. The L1 cache 138 may include a single module that provides "get node with node id" and "writes node with node id" interfaces and ensures that only nodes that are accessed recently are kept in memory (and others are flushed).

As used herein, a key (e.g., the key 112) may include a sequence of bytes representing an object or entity (e.g., an object or entity of the data 106, such as the data 114) that an application (e.g., the application 142) reads or writes using key value or object storage techniques. As used herein, key metadata (e.g., the key metadata 108) may include information related to the corresponding key (e.g., the key 112) usable to determine the status of the key and to access it. As used herein, key data (e.g., the data 114) may include opaque data associated with the key (e.g., the key 112), and a node ID may refer to a unique identification or address assigned to each node in the b-tree (e.g., each node of the hierarchical data structure 150).

Using a read path of the b-tree may include searching nodes of the b-tree for a particular key (e.g., the key 112). To illustrate, the search may start from the root node (e.g., the node 152) and may narrow to a subtree (e.g., the subtree corresponding to the nodes 154, 156, and 158) that stores the particular key. Searched nodes of the b-tree may be cached at the L1 cache 138. The L1 cache 138 may store internal nodes (also referred to herein as non-leaf nodes), leaf nodes, and overflow nodes. In response to a cache miss at the L1 cache 138 for a particular node, the node may be accessed at the memory 104.

A read operation of the b-tree may include traversing a read path of the b-tree starting from a root node (e.g., the node 152) of the b-tree and determining whether the node is a leaf node. If the node is not a leaf node, the read path may be traversed (e.g., by moving from the node 152 to the node 154) until the key is located. If the node is a leaf node, then the node may be read (e.g., by reading the data 114) from the L1 cache 138 and data associated with the key (e.g., the data 114) if the key is located. If the key is not located (e.g., after reaching a leaf node, such as the node 156), a failure may be detected. In an illustrative example, a key (e.g., the key 112) may include a sequence of bytes, and an application (e.g., the application 142) may include or access a comparator to compare keys. Multiple read operations may be performed in parallel at the data storage device 102 (e.g., to access multiple nodes of the hierarchical data structure 150 in parallel).

An update operation of the b-tree may include traversing an update path of the b-tree. Traversing the update path may correspond to traversal of the read path of the b-tree if there is no need to split a non-leaf (or internal) node. If traversal of the update path reaches a leaf node, a write lock may be applied to the leaf node, and the key may be updated. In certain illustrative implementations, an update operation may target a counter of a NOSQL database (e.g., the data 106), a fixed size attribute, or metadata (e.g., the key metadata 108) of an object (e.g., a data object corresponding to the node 156).

An operation may be performed to "restructure" the b-tree, such as by moving a key from one node to another node (e.g., due to a node split operation or a node merge operation). Examples of restructuring operations may include "new write" operations and delete operations. A restructuring operation may trigger an update of the BFNLS (e.g., by updating the BFNLS in response to a node split operation or a node merge operation). For example, if a key (e.g., the key 112) is "moved" from the node 156 to the node 158 due to a node split operation or a node merge operation, the data storage device 102 may modify (e.g., overwrite) the node ID 132 with a node ID corresponding to the node 158.

The auxiliary mapping data 124 may include a cache of user visible keys and node IDs of the b-tree. The auxiliary mapping data 124 may also include a set of interfaces to enable identification and update the node ID corresponding to a key (e.g., the node ID 132 associated with the indication 130, which corresponds to the key 112) in connection with read operations, write operations, update operations, and delete operations. The auxiliary mapping data 124 may include an open chaining based hash data structure to store the node IDs corresponding to keys. Alternatively, the auxiliary mapping data 124 may include another data structure, such as a bucket hash data structure, as an illustrative example. The data structure of the auxiliary mapping data 124 may enable faster searches as compared to searching the hierarchical data structure 150. For example, if a search of the hierarchical data structure 150 includes N operations, a search of the auxiliary mapping data 124 may include O(log(N)) operations.

In some implementations, the auxiliary mapping data 124 may include multiple entries per key. For example, an indication (e.g., the indication 130) may correspond to a group of keys. To further illustrate, the group of keys may be associated with a single leaf node (e.g., the node 156), or within a group of nodes, such as using a "next" node pointer (so that one node points to another node). The group of keys may correspond to a row of nodes each having a common portion (e.g., a common row indication, such as a "row1" prefix). Alternatively or in addition, the group of keys may correspond to a logical group of nodes, such as a row of an NOSQL database or another logical group, such as metadata attributes of an object. Grouping keys in such a manner may increase memory efficiency by reducing a number of entries of the auxiliary mapping data 124.

In an illustrative example, the data 106 corresponds to a NOSQL database, and each set of keys associated with the NOSQL database corresponds to a logical entity, such as a row, a collection, or another group of keys. The keys of a logical entity may be included in a particular leaf node (e.g., the node 156) or in a set of leaf nodes (e.g., a set of adjacent leaf nodes, such as a set of nodes that includes the nodes 156, 158). The keys of a logical entity may be similar. For example, the keys of a logical entity may be sequential or approximately sequential (e.g., differing by one or two least significant bytes). In an illustrative example, each key of a row may have a format corresponding to "row#:column:#," such as "row1:column1," row1:column2," etc. In this case, the auxiliary mapping data 124 may an indication of a single key from the logical entity or the common part of each key of the logical entity. Other keys of the logical entity may be indicated by a pointer (e.g., a b-tree leaf node next pointer). For example, the indication 130 may correspond to a hash value of a particular key of a logical entity (e.g., a row), or the indication 130 may correspond to a hash value of a set of one or more bytes that is common to each key of a logical entity (e.g., a row, such as "row1" in the preceding example), and other keys of the logical entity may be determined based on a pointer.

A set operation may be performed at the data storage device 102 to set (e.g., modify) a mapping of a key to a node ID indicated by the auxiliary mapping data 124. An illustrative example of a set operation may include receiving a key (e.g., the key 112) and a node ID (e.g., the node ID 132) and determining a hash of the key (e.g., the hash value 146). The hash may be shorter than (e.g., may include fewer bits or bytes than) the key. In an illustrative implementation, hash operations may be performed in connection with a variable-length hierarchical data structure 150. If the hierarchical data structure 150 is of a fixed length, hash operations may be omitted from certain examples described herein. In this case, the auxiliary mapping data 124 may include a mapping of keys (e.g., the key 112) to node IDs (e.g., the node ID 132). The set operation may further include attempting to find the hash (or the key) in the auxiliary mapping data 124. If the hash (or the key) in the auxiliary mapping data 124 is found, the set operation may further include modifying the node ID corresponding to the hash (or the key). If the hash is not found in the auxiliary mapping data 124, the hash operation may be retried one or more times (e.g., using three hash retries). If after retrying the hash operation the hash is not found, the set operation may fail.

A get operation may be performed at the data storage device 102. An illustrative example of a get operation may include receiving a key (e.g., the key 112) a node ID (e.g., the node ID 132) and determining a hash (e.g., the hash value 146) based on the key. The get operation may further include attempting to find the hash (or the key) in the auxiliary mapping data 124. If the hash (or the key) in the auxiliary mapping data 124 is found, the get operation may further include identifying a node ID (e.g., the node ID 132) corresponding to the hash (or the key) and accessing the L1 cache 138 and/or the memory 104 using the node ID. If the hash is not found in the auxiliary mapping data 124, the hash operation may be retried one or more times (e.g., using three hash retries). If after retrying the hash operation the hash is not found, the get operation may fail.

A read operation may be performed at the data storage device 102 to read an entry of the auxiliary mapping data 124. The read operation may include receiving a read object request (e.g., in connection with execution of the application 142 by the processor 140 or from the device 180). The read object request may indicate a key (e.g., the key 112). The hash engine 144 may determine a hash (e.g., the hash value 146) based on the key and may perform a node ID lookup (e.g., by determining the value at an index that is a logical identification of a leaf node, such as the node 156). If the node ID lookup is successful, the read operation may further include directly accessing the leaf node (e.g., by accessing the L1 cache 138 and/or the memory 104 using the node ID 132). If the node ID lookup is unsuccessful, the read operation may further include performing a search operation to locate the node (e.g., by searching the L1 cache 138 and/or the memory 104 for the node ID 132). After locating the node ID, the auxiliary mapping data 124 may be updated to indicate a mapping of the key and the node ID. The read operation may also include responding to the read object request (e.g., by providing the data 114 to the processor 140 or to the device 180).

An update operation may be performed at the data storage device 102 to update an entry of the auxiliary mapping data 124. The update operation may include receiving an update object request (e.g., in connection with execution of the application 142 by the processor 140 or from the device 180). The update object request may indicate a key (e.g., the key 112). The hash engine 144 may determine a hash (e.g., the hash value 146) based on the key and may perform a node ID lookup (e.g., by determining the value at an index that is a logical identification of a leaf node, such as the node 156). If the node ID lookup is successful, the update operation may further include updating a mapping of the key and the node ID (e.g., by modifying the node ID 132 to indicate another node, such as the node 158 instead of the node 156) if updating the mapping does not cause an overflow at the auxiliary mapping data 124. If updating the mapping would cause an overflow at the auxiliary mapping data 124, data at the L1 cache 138 and/or the memory 104 may be updated (instead of updating the auxiliary mapping data 124). If the node ID lookup is unsuccessful, the update operation may further include searching the L1 cache 138 and/or the memory 104 for the node ID. After locating the node ID, the auxiliary mapping data 124 may be updated to indicate a mapping of the key and the node ID. The update operation may also include responding to the update object request (e.g., by providing the data 114 to the processor 140 or to the device 180).

Figure 2:
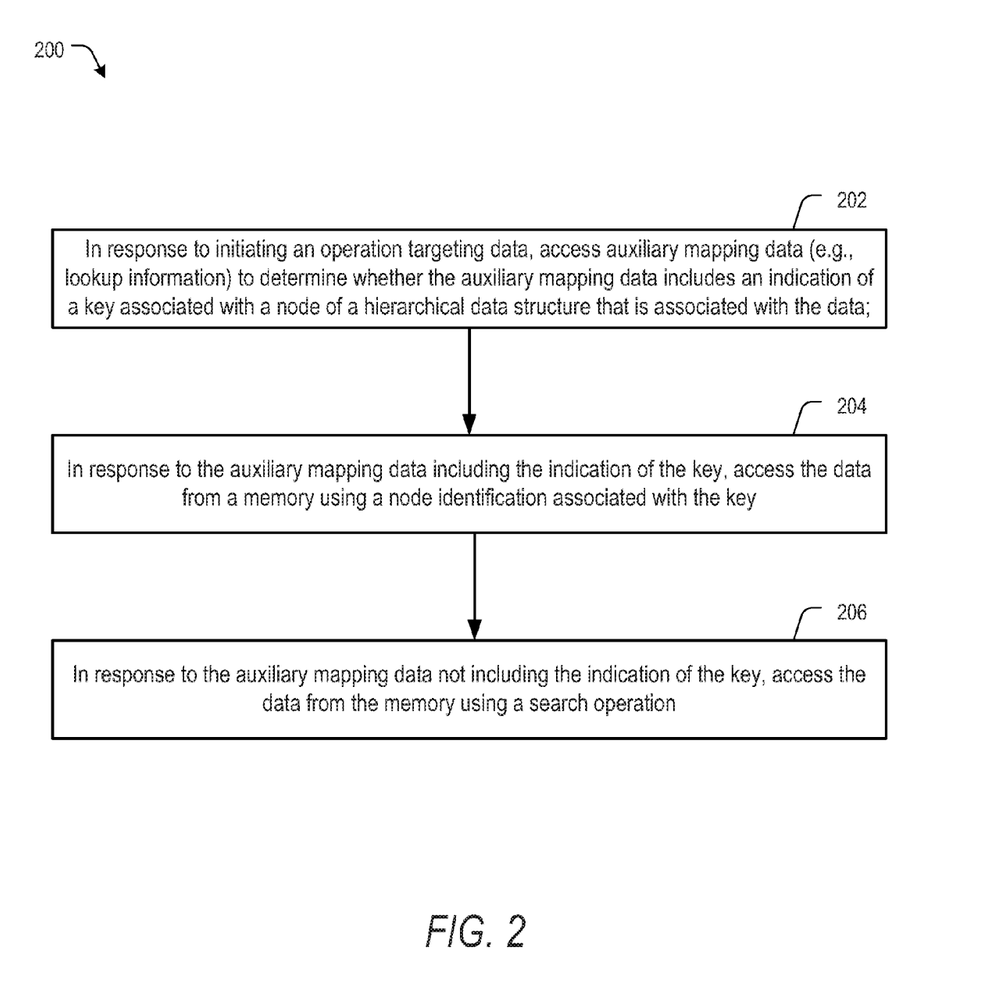
FIG. 2 is a flow chart of a particular illustrative embodiment of a method of using auxiliary mapping data.

Referring to FIG. 2, an illustrative example of a method is depicted and generally designated 200. In an illustrative example, the method 200 is performed at the data storage device 102 (e.g., in connection with the examples of FIG. 1A). In another example, the method 200 is performed at the device 180 (e.g., in connection with the examples of FIG. 1B).

The method 200 includes accessing auxiliary mapping data (e.g., lookup information) to determine whether the auxiliary mapping data includes an indication of a key associated with a node of a hierarchical data structure that is associated with the data in response to initiating an operation targeting the data, at 202. The auxiliary mapping data is accessed in response to initiating an operation targeting the data. The auxiliary mapping data may correspond to the auxiliary mapping data 124, the indication may correspond to the indication 130, and the key may correspond to the key 112. The node may correspond to one of the nodes 154, 156, the hierarchical data structure may correspond to the hierarchical data structure 150, and the data may correspond to the data 114.

The method 200 further includes accessing the data from a memory using a node identification associated with the key in response to the auxiliary mapping data including the indication of the key, at 204. The memory may correspond to the memory 104 or the L1 cache 138. The node identification may correspond to the node ID 132. Accessing the data using the indication may include bypassing one or more internal nodes of the hierarchical data structure to directly access the node, such as by bypassing the nodes 152, 154 to directly access the node 156 or the node 158.

The method 200 further includes accessing the data from the memory using a search operation in response to the auxiliary mapping data not including the indication of the key, at 206. Accessing the data using the search operation may include searching one or more internal nodes of the hierarchical data structure to identify the node, such as by searching (or "crawling") the nodes 152, 154 to identify the node 156 or the node 158.

In an illustrative example, the method 200 further includes performing a hash operation based on the key to generate the indication and also includes searching the auxiliary mapping data for the indication to determine whether the auxiliary mapping data includes the indication. For example, the hash engine 144 may generate the hash value 146, and the controller 120 may search the auxiliary mapping data 124 to determine whether the auxiliary mapping data 124 includes an indication corresponding to the hash value 146. The method 200 may optionally include retrying the hash operation one or more times after failing to identify the key by searching the auxiliary mapping data.

The method 200 may simplify operation of a device in connection with data accesses based on a data structure. For example, by directly accessing data based on a node ID, a "search" for the data may be avoided in some cases. Latency associated with an operation may be reduced by avoiding a "search" for the data.

Figure 3:
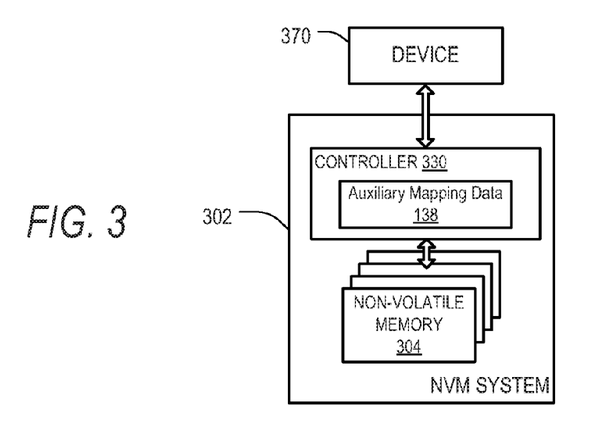
FIG. 3 is a block diagram of a particular illustrative embodiment of a non-volatile memory system.

Referring to FIG. 3, a non-volatile memory system 302 (e.g., the data storage device 102) may be coupled to a device 370 (e.g., the device 180). The non-volatile memory system 302 includes a controller 330 (e.g., the controller 120) and non-volatile memory that may be made up of one or more non-volatile memory dies 304 (e.g., one or more memory dies included in the memory device 103). As used herein, the term "memory die" refers to the collection of non-volatile memory cells, and associated circuitry for managing the physical operation of those non-volatile memory cells, that are formed on a single semiconductor substrate. The controller 330 interfaces with the device 370 and transmits command sequences for read, program, and erase operations to the one or more non-volatile memory dies 304. The controller 330 stores the auxiliary mapping data 124.

The controller 330 (which may be a flash memory controller) may take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 330 may be configured with hardware and/or firmware to perform the various functions described below and shown in the flow diagrams. Also, some of the components shown as being internal to the controller 330 can be stored external to the controller 330, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory, map out bad flash memory cells, and allocate spare cells to be substituted for future failed cells. Some part of the spare cells can be used to hold firmware to operate the flash memory controller and implement other features. In operation, when a host device is to read data from or write data to the flash memory, the host device communicates with the flash memory controller. If the host device provides a logical address to which data is to be read/written, the flash memory controller can convert the logical address received from the host device to a physical address in the flash memory. (Alternatively, the host device can provide the physical address.) The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

The one or more non-volatile memory dies 304 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between the controller 330 and the one or more non-volatile memory dies 304 may be any suitable flash interface, such as Toggle Mode. In one embodiment, the non-volatile memory system 302 may be a card based system, such as a secure digital (SD) or a micro secure digital (micro-SD) card. In an alternate embodiment, the non-volatile memory system 302 may be part of an embedded memory system.

Although, in the example illustrated in FIG. 3, the non-volatile memory system 302 (sometimes referred to herein as a storage module) includes a single channel between the controller 330 and the one or more non-volatile memory dies 304, the subject matter described herein is not limited to having a single memory channel. For example, in some NAND memory system architectures (such as the ones shown in FIGS. 6 and 7), 2, 4, 8 or more NAND channels may exist between the controller 330 and the NAND memory device, depending on controller capabilities. In any of the embodiments described herein, more than a single channel may exist between the controller 330 and the one or more non-volatile memory dies 304, even if a single channel is shown in the drawings.

Figure 4:
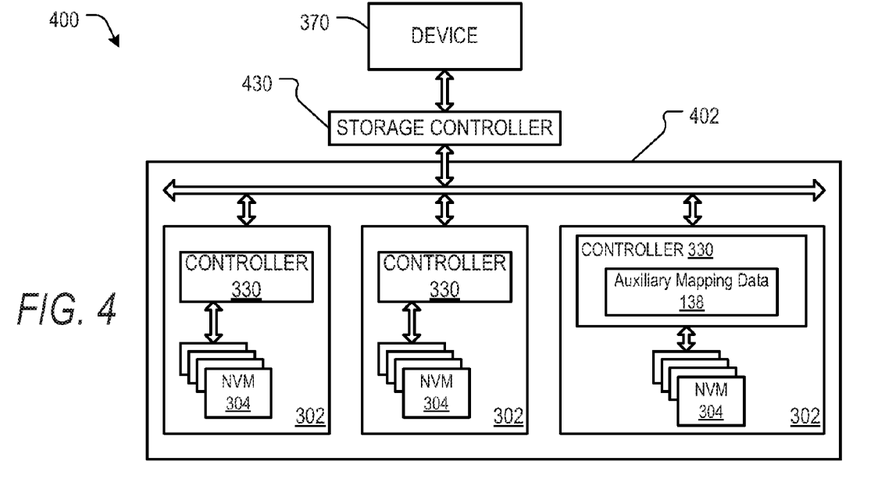
FIG. 4 is a block diagram of a particular illustrative embodiment of a storage system including a plurality of the non-volatile memory systems of FIG. 3.

FIG. 4 illustrates a storage system 400 that includes multiple non-volatile memory systems 302. As such, storage system 400 may include a storage controller 430 that interfaces with the device 370 (e.g., a host device) and with a storage system 402, which includes a plurality of non-volatile memory systems 302. The interface between the storage controller 430 and the non-volatile memory systems 302 may be a bus interface, such as a serial advanced technology attachment (SATA) or peripheral component interface express (PCIe) interface. The storage system 400 may correspond to a solid state drive (SSD), such as found in portable computing devices, such as laptop computers, and tablet computers. One or more of the controllers 330 of FIG. 4 may store the auxiliary mapping data 124. The storage controller 430 may store the auxiliary mapping data 124.

Figure 5:
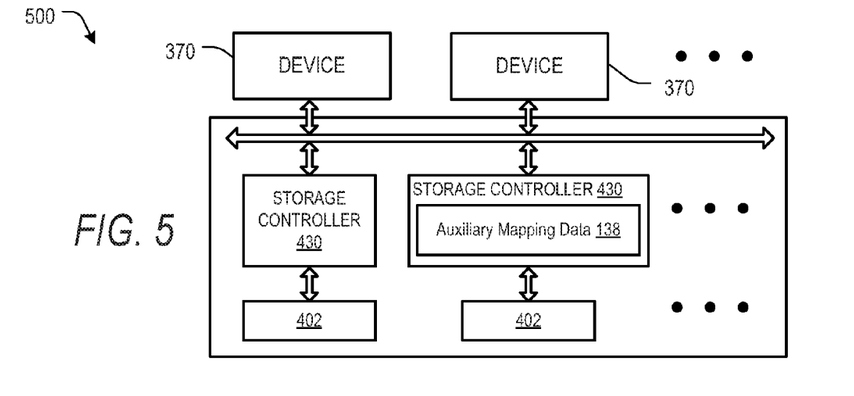
FIG. 5 is a block diagram of a particular illustrative embodiment of a hierarchical storage system.

FIG. 5 is a block diagram illustrating a hierarchical storage system 500. The hierarchical storage system 500 includes a plurality of storage controllers 430, each of which controls a respective storage system 402. Devices 370 (e.g., one or more host devices or accessing devices) may access memories within the hierarchical storage system 500 via a bus interface. In one embodiment, the bus interface may be an NVMe or fiber channel over Ethernet (FCoE) interface. In one embodiment, the hierarchical storage system 500 illustrated in FIG. 5 may be a rack mountable mass storage system that is accessible by multiple host computers, such as would be found in a data center or other location where mass storage is needed. One or more storage controllers 430 of FIG. 5 may store the auxiliary mapping data 124.

Figure 6:
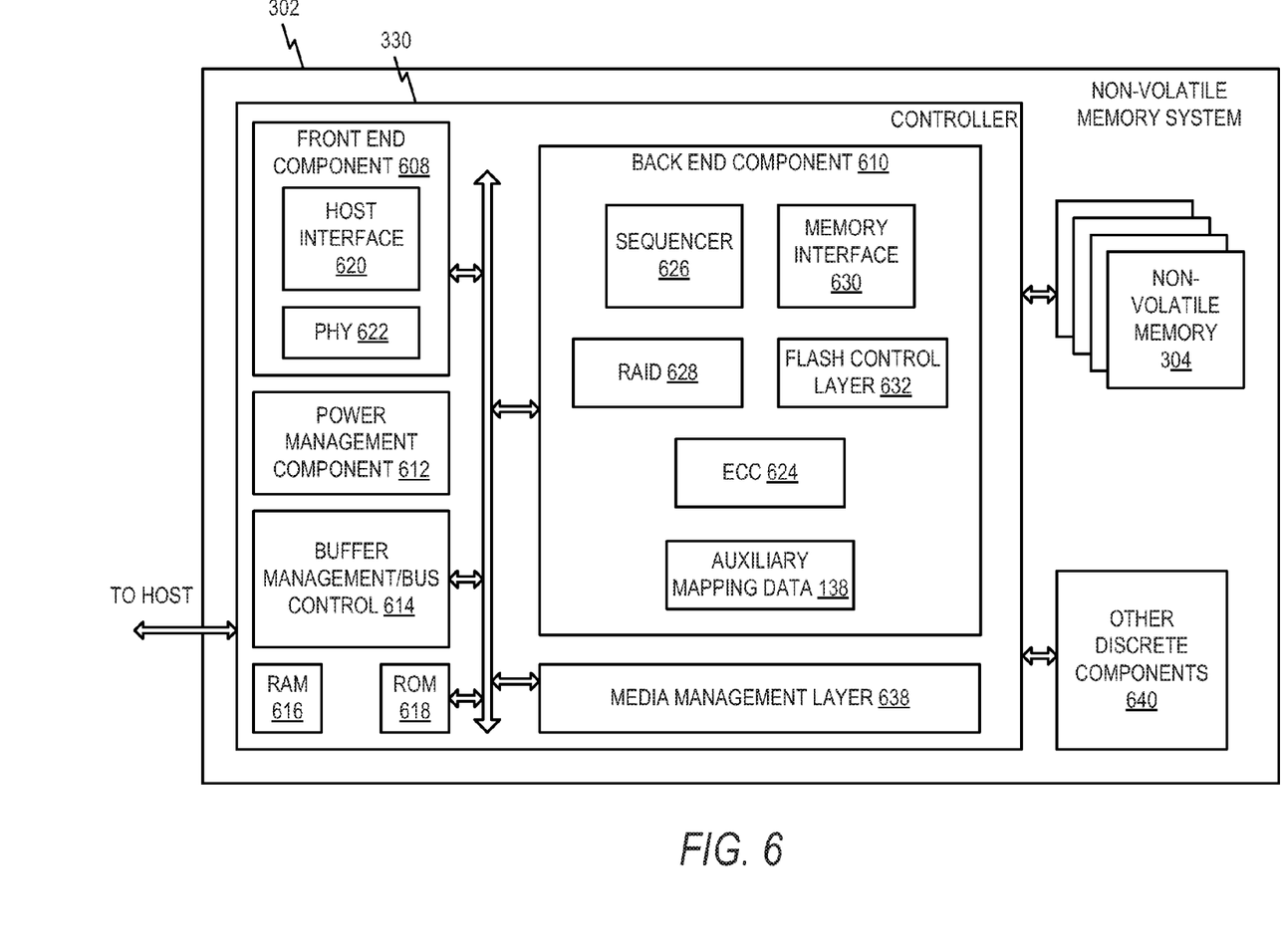
FIG. 6 is a block diagram of a memory system and depicts components of a particular illustrative embodiment of a controller.

FIG. 6 is a block diagram illustrating exemplary components of the controller 330 of the non-volatile memory system 302 in more detail. The controller 330 stores the auxiliary mapping data 124. The controller 330 also includes a front end component 608 that interfaces with a host device, a back end component 610 that interfaces with the one or more non-volatile memory dies 304, and various other modules that perform other functions. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

Referring again to the controller 330, a buffer manager/bus controller 614 manages buffers in random access memory (RAM) 616 (e.g., the RAM 122) and controls the internal bus arbitration of the controller 330. A read only memory (ROM) 618 stores system boot code. Although illustrated in FIG. 6 as located within the controller 330, in other embodiments one or both of the RAM 616 and the ROM 618 may be located externally to the controller 330. In yet other embodiments, portions of RAM and ROM may be located both within the controller 330 and outside the controller 330.

Front end component 608 includes a host interface 620 and a physical layer interface (PHY) 622 that provide the electrical interface with the host device or next level storage controller. The choice of the type of host interface 620 can depend on the type of memory being used. Examples of host interfaces 620 include, but are not limited to, SATA, SATA Express, SAS, Fibre Channel, USB, PCIe, and NVMe. The host interface 620 typically facilitates transfer for data, control signals, and timing signals.

Back end component 610 includes an error correcting code (ECC) engine 624 that encodes the data received from the host device, and decodes and error corrects the data read from the non-volatile memory, such as the data 106. A command sequencer 626 generates command sequences, such as program and erase command sequences, to be transmitted to the one or more non-volatile memory dies 304. A RAID (Redundant Array of Independent Drives) component 628 manages generation of RAID parity and recovery of failed data. The RAID parity may be used as an additional level of integrity protection for the data being written into the one or more non-volatile memory dies 304. In some cases, the RAID component 628 may be a part of the ECC engine 624. A memory interface 630 provides the command sequences to non-volatile memory die 304 and receives status information from the one or more non-volatile memory dies 304. For example, the memory interface 630 may be a double data rate (DDR) interface, such as a Toggle Mode interface. A flash control layer 632 controls the overall operation of back end component 610.

Additional components of the non-volatile memory system 302 illustrated in FIG. 6 include a power management component 612 and a media management layer 638, which performs wear leveling of memory cells of the one or more non-volatile memory dies 304. The non-volatile memory system 302 may also include one or more other components or features illustrated with reference to FIGS. 1 and 2, such as the auxiliary mapping data 124, as an illustrative example. Non-volatile memory system 302 also includes other discrete components 640, such as external electrical interfaces, external RAM, resistors, capacitors, or other components that may interface with the controller 330. In alternative embodiments, one or more of the physical layer interface 622, RAID component 628, media management layer 638 and buffer management/bus controller 614 are optional components that are omitted from the controller 330.

Figure 7:
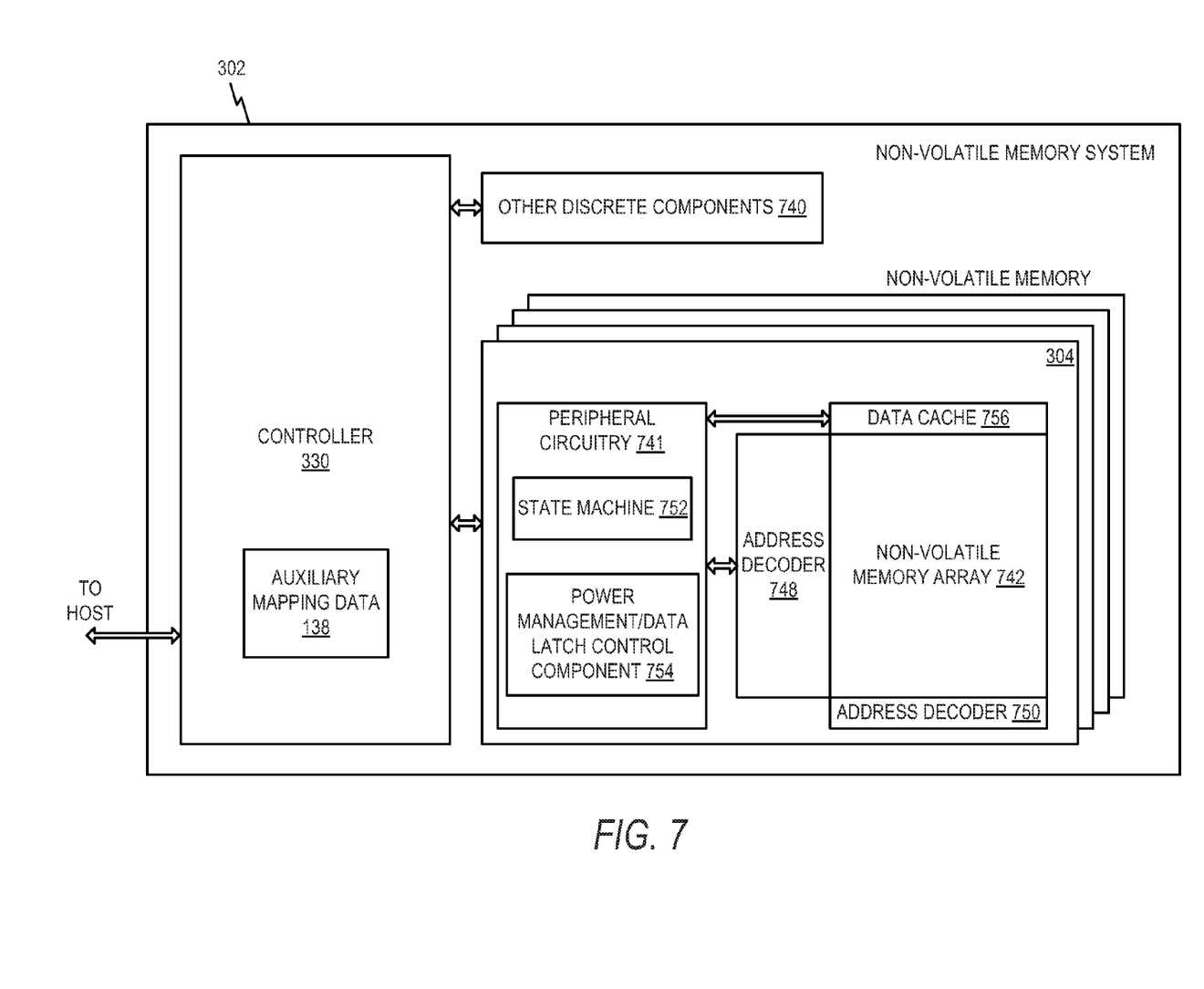
FIG. 7 is a block diagram of a memory system and depicts components of a particular illustrative embodiment of a non-volatile memory die.

FIG. 7 is a block diagram illustrating exemplary components of the one or more non-volatile memory dies 304 of the non-volatile memory system 302 in more detail. The one or more non-volatile memory dies 304 include peripheral circuitry 741 and a non-volatile memory array 742. The non-volatile memory array 742 includes the non-volatile memory cells used to store data. The non-volatile memory cells may be any suitable non-volatile memory cells, including NAND flash memory cells and/or NOR flash memory cells in a two dimensional and/or three dimensional configuration. The peripheral circuitry 741 includes a state machine 752 that provides status information to the controller 330, which may store the auxiliary mapping data 124. The peripheral circuitry 741 may also include a power management or data latch control component 754. The one or more non-volatile memory dies 304 further include discrete components 740, an address decoder 748, an address decoder 750, and a data cache 756 that caches data.

Although various components depicted herein are illustrated as block components and described in general terms, such components may include one or more microprocessors, state machines, or other circuits configured to enable such components to perform one or more operations described herein. For example, the hash engine 144 may represent physical components, such as hardware controllers, state machines, logic circuits, or other structures, to enable the controller 120 to store and modify the auxiliary mapping data 124.

Alternatively or in addition, the hash engine 144 may be implemented using a microprocessor or microcontroller programmed to perform a hash operation. In a particular embodiment, the hash engine 144 includes a processor executing instructions (e.g., firmware) that are stored at the memory 104. Alternatively, or in addition, executable instructions that are executed by the processor may be stored at a separate memory location that is not part of the memory 104, such as at a read-only memory (ROM).

It should be appreciated that one or more operations described herein as being performed by the controller 120 may be performed at the memory device 103. As an illustrative example, in-memory ECC operations (e.g., encoding operations and/or decoding operations) may be performed at the memory device 103 alternatively or in addition to performing such operations at the controller 120.

The data storage device 102 may be coupled to, attached to, or embedded within one or more accessing devices, such as within a housing of the device 180. For example, the data storage device 102 may be embedded within the device 180 in accordance with a Joint Electron Devices Engineering Council (JEDEC) Solid State Technology Association Universal Flash Storage (UFS) configuration. To further illustrate, the data storage device 102 may be integrated within an electronic device (e.g., the device 180), such as a mobile telephone, a computer (e.g., a laptop, a tablet, or a notebook computer), a music player, a video player, a gaming device or console, an electronic book reader, a personal digital assistant (PDA), a portable navigation device, or other device that uses internal non-volatile memory.

In one or more other implementations, the data storage device 102 may be implemented in a portable device configured to be selectively coupled to one or more external devices, such as a host device. For example, the data storage device 102 may be removable from the device 180 (i.e., "removably" coupled to the device 180). As an example, the data storage device 102 may be removably coupled to the device 180 in accordance with a removable universal serial bus (USB) configuration.

The device 180 may correspond to a mobile telephone, a computer (e.g., a laptop, a tablet, or a notebook computer), a music player, a video player, a gaming device or console, an electronic book reader, a personal digital assistant (PDA), a portable navigation device, another electronic device, or a combination thereof. The device 180 may communicate via a controller, which may enable the device 180 to communicate with the data storage device 102. The device 180 may operate in compliance with a JEDEC Solid State Technology Association industry specification, such as an embedded MultiMedia Card (eMMC) specification or a Universal Flash Storage (UFS) Host Controller Interface specification. The device 180 may operate in compliance with one or more other specifications, such as a Secure Digital (SD) Host Controller specification as an illustrative example. Alternatively, the device 180 may communicate with the data storage device 102 in accordance with another communication protocol. In some implementations, the data storage device 102 may be integrated within a network-accessible data storage system, such as an enterprise data system, an NAS system, or a cloud data storage system, as illustrative examples.

In some implementations, the data storage device 102 may include a solid state drive (SSD). The data storage device 102 may function as an embedded storage drive (e.g., an embedded SSD drive of a mobile device), an enterprise storage drive (ESD), a cloud storage device, a network-attached storage (NAS) device, or a client storage device, as illustrative, non-limiting examples. In some implementations, the data storage device 102 may be coupled to the device 180 via a network. For example, the network may include a data center storage system network, an enterprise storage system network, a storage area network, a cloud storage network, a local area network (LAN), a wide area network (WAN), the Internet, and/or another network.

To further illustrate, the data storage device 102 may be configured to be coupled to the device 180 as embedded memory, such as in connection with an embedded MultiMedia Card (eMMC®) (trademark of JEDEC Solid State Technology Association, Arlington, Va.) configuration, as an illustrative example. The data storage device 102 may correspond to an eMMC device. As another example, the data storage device 102 may correspond to a memory card, such as a Secure Digital (SD®) card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). The data storage device 102 may operate in compliance with a JEDEC industry specification. For example, the data storage device 102 may operate in compliance with a JEDEC eMMC specification, a JEDEC Universal Flash Storage (UFS) specification, one or more other specifications, or a combination thereof.

The memory 104 may include a resistive random access memory (ReRAM), a flash memory (e.g., a NAND memory, a NOR memory, a single-level cell (SLC) flash memory, a multi-level cell (MLC) flash memory, a divided bit-line NOR (DINOR) memory, an AND memory, a high capacitive coupling ratio (HiCR) device, an asymmetrical contactless transistor (ACT) device, or another flash memory), an erasable programmable read-only memory (EPROM), an electrically-erasable programmable read-only memory (EEPROM), a read-only memory (ROM), a one-time programmable memory (OTP), another type of memory, or a combination thereof. In a particular embodiment, the data storage device 102 is indirectly coupled to an accessing device (e.g., the device 180) via a network. For example, the data storage device 102 may be a network-attached storage (NAS) device or a component (e.g., a solid-state drive (SSD) component) of a data center storage system, an enterprise storage system, or a storage area network. The memory 104 may include a semiconductor memory device.

Semiconductor memory devices include volatile memory devices, such as dynamic random access memory ("DRAM") or static random access memory ("SRAM") devices, non-volatile memory devices, such as resistive random access memory ("ReRAM"), magnetoresistive random access memory ("MRAM"), electrically erasable programmable read only memory ("EEPROM"), flash memory (which can also be considered a subset of EEPROM), ferroelectric random access memory ("FRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure. In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in they direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Alternatively, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this disclosure is not limited to the two dimensional and three dimensional exemplary structures described but cover all relevant memory structures within the spirit and scope of the disclosure as described herein and as understood by one of skill in the art. The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments. Those of skill in the art will recognize that such modifications are within the scope of the present disclosure.

The above-disclosed subject matter is to be considered illustrative, and not restrictive, and the appended claims are intended to cover all such modifications, enhancements, and other embodiments, that fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   in response to initiating an operation targeting data, accessing auxiliary mapping data with a processor to determine whether the auxiliary mapping data includes an indication of a key associated with a node of a single hierarchical data structure that is associated with the data;
   in response to the auxiliary mapping data including the indication of the key, accessing the data from a memory using a node identification associated with the key in a single lookup table which indicates a mapping of a leaf node, wherein the key is associated with the leaf node, the single lookup table separate from a level 1 cache;
   in response to the auxiliary mapping data not including the indication of the key, accessing the data from the memory using a search operation;
   performing a hash operation based on the key to generate the indication;
   searching the auxiliary mapping data for the indication; and retrying the hash operation one or more times after failing to identify the key by searching the auxiliary mapping data.

2. The method of claim 1, wherein accessing the data using the node identification includes bypassing one or more internal nodes of the hierarchical data structure to directly access the node.

3. The method of claim 1, wherein accessing the data using the search operation includes searching one or more internal nodes of the hierarchical data structure to identify the node.

4. The method of claim 1, wherein the key points to a single data object of the data.

5. The method of claim 1, wherein the key points to a group of multiple data objects of the data.

6. The method of claim 5, wherein the data corresponds to a non-relational database, and wherein the group of multiple data objects corresponds to a row key of the non-relational database.

7. The method of claim 1, wherein the data is associated with a database, a key value store, an object store, or a file system.

8. An apparatus comprising:
a first group of storage elements configured to store first data associated with a tiered data structure having a root node and a set of leaf nodes;
a second group of storage elements configured to store second data corresponding to a single lookup table associated with the tiered data structure and separate from a level 1 cache, the single lookup table indicating a mapping of a leaf node of the set of leaf nodes to an indication of a key that is associated with the leaf node; and
a controller configured to perform a hash operation based on the key to generate the indication, wherein the controller is configured to search an auxiliary mapping data for the indication, and wherein the controller is configured to retry the hash operation one or more times after failing to identify the key by searching the auxiliary mapping data.

9. The apparatus of claim 8, wherein the controller is configured to access the lookup table.

10. The apparatus of claim 9, wherein the controller is further configured to bypass one or more internal nodes of the tiered data structure by directly accessing the leaf node using a node identification indicated by the lookup table.

11. The apparatus of claim 9, wherein the controller includes a hash engine configured to perform the hash operation based on the key to generate the indication and to store the indication to the second group of storage elements.

12. The apparatus of claim 9, wherein the controller is further configured to access the node in connection with one or more of a read process associated with the leaf node, a write process associated with the leaf node, or an update process associated with the leaf node.

13. The apparatus of claim 9, wherein the controller is further configured to update the single lookup table using one or more of a read operation, a write operation, an update operation, or a delete operation.

14. The apparatus of claim 8, further comprising a level one (L1) cache configured to store at least a subset of the first data, wherein the L1 cache is distinct from the single lookup table.

15. The apparatus of claim 8, further comprising a non-volatile memory that includes the first group of storage elements.

16. The apparatus of claim 8, further comprising a random access memory (RAM) that includes the second group of storage elements.

17. A data storage device comprising:
a memory; and
a controller coupled to the memory, wherein the controller is configured to access data stored at the memory based on a key associated with the data, wherein the data is associated with a hierarchical data structure, and wherein the controller is further configured to access lookup information associated with the hierarchical data structure, the lookup information in a single look up table format, separate from a level 1 cache, and including an indication associated with the key wherein the key is associated with a leaf node and further indicating a node identification associated with the indication, wherein the controller is configured to perform a hash operation based on the key to generate the indication, wherein the controller is configured to search an auxiliary mapping data for the indication, and wherein the controller is configured to retry the hash operation one or more times after failing to identify the key by searching the auxiliary mapping data.

18. The data storage device of claim 17, wherein the controller is further configured to bypass one or more internal nodes of the hierarchical data structure by directly accessing a leaf node using a node identification indicated by the lookup information.

* * * * *